(12) United States Patent
Prevot et al.

(10) Patent No.: US 10,563,799 B2
(45) Date of Patent: Feb. 18, 2020

(54) SYSTEM FOR COUPLING TWO TUBES

(71) Applicant: ETABLISSEMENTS CAILLAU, Issy-les-Moulineaux (FR)

(72) Inventors: Fabrice Prevot, Selles sur Cher (FR); Nicolas Rigollet, Romorantin (FR); Stéphane Drivon, Romorantin (FR)

(73) Assignee: Etablissements Caillau (FR)

( * ) Notice: Subject to any disclaimer, the term of this patent is extended or adjusted under 35 U.S.C. 154(b) by 60 days.

(21) Appl. No.: 15/508,382

(22) PCT Filed: Sep. 3, 2015

(86) PCT No.: PCT/FR2015/052333
§ 371 (c)(1),
(2) Date: Mar. 2, 2017

(87) PCT Pub. No.: WO2016/034820
PCT Pub. Date: Mar. 10, 2016

(65) Prior Publication Data
US 2017/0284578 A1     Oct. 5, 2017

(30) Foreign Application Priority Data

Sep. 4, 2014 (FR) .................................... 14 58303

(51) Int. Cl.
*F16L 23/08*     (2006.01)
*F16L 23/00*     (2006.01)
(Continued)

(52) U.S. Cl.
CPC .............. *F16L 23/08* (2013.01); *F16L 23/003* (2013.01); *F16L 23/032* (2013.01); *F16L 23/20* (2013.01)

(58) Field of Classification Search
CPC .......... F16L 23/08; F16L 23/003; F16L 23/04
(Continued)

(56) References Cited

U.S. PATENT DOCUMENTS 3,889,984 A * 6/1975 Lambiris ................. F16L 25/04
                                                            285/27
5,915,739 A * 6/1999 Cradduck ............... F16L 33/03
                                                            285/23
(Continued)

FOREIGN PATENT DOCUMENTS

DE          103 36 351 B3    11/2004
DE     20 2013 001 224 U1     2/2013
(Continued)

OTHER PUBLICATIONS

PCT International Search Report, PCT/FR2015/052333, dated Sep. 3, 2015, Priority Date Sep. 4, 2014, Nils Untermann, Office Europeen des Brevets, Nov. 10, 2015, 4 pages.

*Primary Examiner* — David Bochna
(74) *Attorney, Agent, or Firm* — Fay Sharpe LLP; James E. Scarbrough (57) ABSTRACT

The system comprises a clamping collar having a clamping band suitable for being tightened around the abutting ends of the two tubes. The collar has a retaining tab that presents a fastener portion whereby said retaining tab is fastened to the band of the collar and that extends substantially axially towards an attachment portion of said retaining tab whereby said retaining tab is suitable for being attached to the first tube in the vicinity of its first end.

14 Claims, 4 Drawing Sheets

(51) Int. Cl.
*F16L 23/032* (2006.01)
*F16L 23/20* (2006.01)

(58) Field of Classification Search
USPC .................................................. 285/23, 410
See application file for complete search history.

(56) References Cited

U.S. PATENT DOCUMENTS

| | | | | |
|---|---|---|---|---|
| 6,832,786 | B2* | 12/2004 | Duncan | F16L 21/002 |
| | | | | 285/23 |
| 7,320,486 | B2* | 1/2008 | Geppert | F16L 27/04 |
| | | | | 285/410 |
| 7,458,619 | B2* | 12/2008 | Cassel | F16L 21/065 |
| | | | | 285/23 |
| 7,770,937 | B2* | 8/2010 | Ignaczak | F16L 27/04 |
| | | | | 285/410 |
| 8,607,421 | B2* | 12/2013 | Col | F16L 33/08 |
| | | | | 285/23 |
| 8,607,422 | B2* | 12/2013 | Mohan | F16L 33/08 |
| | | | | 285/23 |
| 2014/0217728 | A1* | 8/2014 | Ghirardi | F16L 23/08 |
| | | | | 285/410 |
| 2015/0115605 | A1* | 4/2015 | Gramza | F16L 21/06 |
| | | | | 285/410 |

FOREIGN PATENT DOCUMENTS

| | | | |
|---|---|---|---|
| DE | 102016103687 A1 * | 9/2017 | ............ F16L 23/08 |
| EP | 1 451 498 A1 | 9/2004 | |
| EP | 1 840 439 A2 | 10/2007 | |
| WO | WO 2012/013891 A1 | 2/2012 | |
| WO | WO-2012013891 A1 * | 2/2012 | ........... F16L 23/003 |
| WO | WO-2017149104 A1 * | 9/2017 | ........... F16L 23/003 |

* cited by examiner

SYSTEM FOR COUPLING TWO TUBES

BACKGROUND OF THE DISCLOSURE

The present invention relates to a system for connecting two tubes together end to end, the system comprising a clamping collar having a clamping band suitable for being tightened around the abutted ends of two tubes.

More precisely, the invention relates to a clamping system of the above-specified type that is suitable for being pre-attached at the end of the first tube prior to abutting it with the second tube and tightening the band.

A clamping system of this type is known from Documents EP 1 451 498 and EP 2 598 785, for the particular situation in which the tubes have bearing surfaces and the inside periphery of the collar defines a trough receiving those surfaces.

In the above-mentioned patent documents, the clamping system includes pre-attachment means that, in the non-clamped state of the collar, serve to secure the collar to the first tube before it is coupled with the second tube. The collar is thus, so to speak, left on standby at the end of the first tube in order to facilitate coupling together the first and second tubes, and then clamp the two coupled-together tubes.

The clamping systems described in the above-mentioned patent documents present a washer that is secured to the collar, which washer has tabs or the like for pre-attachment of the assembly comprising the collar and its washer, with the first tube.

Systems of that type give satisfaction, but they require the use of a washer. The washer may have functions other than that of contributing to pre-attachment, in particular it may contribute to sealing the coupling between the two tubes once they have been clamped together. Nevertheless, in certain systems, it is possible to use a sealing washer that is of simpler shape, or indeed to avoid using any such washer, in particular if the tubes are of a shape that itself enhances sealing where the tubes are coupled together, or if the level of sealing required is low.

Document EP 1 840 439 discloses a system for connecting two tubes together end to end, the system comprising a clamping collar having a clamping band suitable for being tightened around the abutting ends of the two tubes, the collar having a retaining tab that presents a fastener portion whereby said retaining tab is fastened to the band of the collar and that extends substantially axially towards an attachment portion of said retaining tab whereby said retaining tab is suitable for being attached to the first tube in the vicinity of its first end.

According to Document EP 1 840 439, before the collar is tightened, that tab can be attached to one of the tubes, e.g. by welding, in order to put the system on standby on the tube, i.e. in a pre-attached situation, prior to abutting the tube with the other tube and then tightening the collar.

Nevertheless, that system raises a problem of effectiveness. Specifically, in order to position the pre-attached system correctly, it is necessary for the tab to be sufficiently rigid. Unfortunately, such rigidity prevents the retaining tab from being deformed easily while tightening the collar, thereby complicating the tightening operation and, in the extreme, that can be detrimental to the effectiveness of the clamping.

In contrast, if the tab is very flexible, so that it can be easily deformed during tightening, it runs the risk of not holding the system correctly in the pre-attached position, thereby complicating the operations of abutting the tubes and of tightening, and that can likewise be detrimental to the effectiveness of the clamping. The present invention seeks to propose a system of the above-specified type for connecting together two tubes, which system is substantially free of the above-mentioned drawbacks.

SUMMARY OF THE DISCLOSURE

Thus, the invention provides a system for connecting two tubes together end to end, the system comprising a clamping collar having a clamping band suitable for being tightened around the abutting ends of the two tubes, the collar having a retaining tab that presents a fastener portion whereby said retaining tab is fastened to the band of the collar, the fastener portion extending substantially axially towards an attachment portion of said retaining tab whereby said retaining tab is suitable for being attached to the first tube in the vicinity of its first end, in which system the retaining tab presents an undulation situated between its fastener portion and its attachment portion.

Thus, according to the invention, the system can be delivered with the retaining tab fastened to the band of the collar and it can be manipulated as a unit. For pre-attachment, it suffices to place the collar in front of the end of the first tube while orienting it in such a manner as to direct the attachment portion of the retaining tab towards the tube, then to pass the band around the end of the first tube, and finally to attach the retaining tab to the first tube. Thus, the system is on standby at the end of the first tube, which can be manipulated as a unit together with the collar that is attached thereto in order to be abutted with the second tube.

Furthermore, the retaining tab can be flexed, in particular in order to accompany the reduction in the diameter of the collar due to the band being tightened, and optionally in order to go past the radial projection of the first tube. The above-mentioned undulation facilitates such flexing by forming a kind of spring incorporated in the retaining tab. Because it is work hardened, this undulation acts as a resilient return spring. The spring is sufficiently stiff to ensure that in the non-clamped state of the band the retaining tab naturally holds the collar in the desired pre-attachment position, while giving the retaining tab the desired flexibility.

The undulation is situated in an intermediate portion of the retaining tab that forms a transition between the fastener portion, which is substantially situated on the diameter of the band of the clamp, and the attachment portion, which is substantially situated on the diameter of the first tube, or more precisely on the diameter defined by a region of the first tube in the vicinity of the collar but not covered by the collar.

The retaining tab may be semi-rigid, i.e. firstly it presents sufficient rigidity when it is attached to the first tube to hold the band of the collar in the desired position at the end of the first tube, in particular a position in which the axis of the collar is substantially in alignment with the axis of the first tube and in which an annular space is defined between the internal periphery of the band and the external periphery of the collar. Secondly, the retaining tab can be flexed during clamping, so as to accompany the reduction in the diameter of the collar that occurs during tightening, while remaining fastened to the band of the collar and remaining attached to the first tube. This ability of the retaining tab to be sufficiently rigid to hold the band of the collar in the desired position and to be capable of deforming by flexing during tightening are facilitated by the above-mentioned undulation.

Optionally, the undulation presents a ridge situated between the attachment portion and the fastener portion, and for example substantially halfway between these portions.

Optionally, the undulation projects radially.

The undulation being oriented so that it projects radially facilitates ensuring that the resilient return forces it provides act in the direction going towards the axis of the collar. Furthermore, the height of the radial projection of the undulation may be determined in such a manner as to remain generally within the radial extent of the collar, thus avoiding forming a projection that is excessive. The ridge of the undulation is then convex when seen from the outside of the tab, i.e. beside the first tube remote from the collar.

Optionally, the undulation is inclined relative to a radial plane, such that going towards the ridge of the undulation involves going away from the fastener portion.

Under such circumstances, the undulation may be of considerable amplitude, while still having a limited radial extent. Furthermore, since it is oriented in the specified direction, the undulation does not interfere with putting the collar into place around the end of the first tube. Furthermore, when the collar is tightened onto the abutting tubes, its diameter decreases and the tab deforms to accompany this decrease in diameter. The inclination of the undulation makes it possible to ensure that during this deformation of the tab, its fastener portion carrying the collar moves essentially radially while remaining substantially in the axial position that it occupied in the pre-attached state, prior to tightening the collar. Thus, the tab has little or no tendency to urge the collar away from its proper axial position relative to the abutting ends of the tubes.

In its general definition, the invention provides at least one retaining tab. Specifically, it is possible to provide a plurality of retaining tabs, e.g. two or three retaining tabs that are angularly distributed in regular manner in order to encourage accurate centering of the collar around the end of the first tube before clamping.

Nevertheless, and as explained below, the presence of a plurality of retaining tabs is not essential for the invention, and on the contrary it is advantageous to provide only one retaining tab.

For example, the band of the collar is made of metal, in particular of stainless steel, of austenic or ferritic type, and the tab is made of the same material and presents thickness that is substantially equal to the thickness of the band.

Optionally, the internal periphery of the collar presents a trough suitable for receiving a radial projection formed at the end of the first tube. In particular, the radial projection is annular and occupies the entire circumference of the first tube so that the precise position of the retaining tab, when considered angularly, is of no particular importance, thereby facilitating fabrication and mounting. By way of example, the radial projection may be in the form of a bearing surface analogous to those described in Documents EP 1 451 498 and EP 2 598 785, projecting relative to the cylindrical outside surface of the first tube.

Optionally, the attachment portion of the retaining tab extends at a distance from the axis of the collar that is less than or equal to the internal diameter of said band in the non-clamped state.

The internal diameter of the band in the non-clamped state is defined so that the band can be engaged on the end of the first tube without the radial projection of the first tube constituting an obstacle to such engagement. In particular, the internal diameter of the band is not less than the diametrical dimension of the first tube as defined by its radial projection. Under such circumstances, once the collar has been attached to the first tube by the attachment portion of the retaining tab, and because the distance from the axis of the collar (i.e. from the axis defined by the turn formed by the band of the collar) is less than or equal to the internal diameter of said band in the non-clamped state, the retaining tab naturally holds the band of the collar around the end of the first tube without the band constituting an obstacle to coupling the tubes together. When the collar is put into place around the first tube, the attachment portion of the tab may be flexed outwards in order to go past the obstacle formed by the radial projection of the first tube, or else, in particular when only one retaining tab is present, the collar may be tilted so as to move the attachment portion of the tab away from the axis of the first tube and thereby enable the attachment portion to go past the radial projection, after which the collar is straightened up in order to bring its axis into alignment with the axis of the first tube and the attachment portion of the retaining tab is then attached to the first tube.

Optionally, the collar presents two ends suitable for being moved relative to each other in order to tighten the collar, and the retaining tab is substantially diametrically opposite these ends.

The retaining tab thus co-operates with a portion of the collar that is remote from the means used for tightening the collar, and therefore does not interfere with those means.

Optionally, the fastener portion is formed at the free end of the retaining tab remote from its attachment portion.

In particular, the fastener and attachment portions may be formed at the opposite ends of the retaining tab.

The fastener portion of the retaining tab may be fastened to the collar by any appropriate means, in particular by at least one of the modes of fastening comprising welding, crimping, clinching, hooking, or clipping.

Optionally, the collar presents two radially projecting ends and a threaded tightening shank co-operating with said ends to move them relative to each other and tighten the collar by screw-fastening.

The invention also provides an assembly for coupling together two tubes, the assembly comprising a first tube and a system of the invention for coupling together two tubes, which first tube is attached to the attachment portion of the retaining tab and is suitable for being abutted with a second tube, the band of the collar extending around the end of the first tube.

This assembly comprises a system of the invention and the first tube having the system pre-attached at its end in a state in which the band of the collar, in the non-clamped state, extends around the end of the first tube.

Optionally, the attachment portion of the retaining tab is attached to the first tube by welding or brazing.

This may be done by any known means, in particular by welding, i.e. by partially melting the attachment portion of the retaining tab. It may in particular comprise one or more spot welds, since the forces to which the welding is subjected are small.

Optionally, the attachment portion of the retaining tab is attached to the first tube by an attachment collar.

The attachment collar may be simple and inexpensive, since its function is to attach the retaining tab to the first tube, without being subjected to severe constraints, in particular mechanically or concerning sealing.

Optionally, in the non-clamped state, the band of the collar is radially spaced apart from the end of the first tube.

Thus, an annular space is defined between the band of the collar and the end of the first tube, into which space the end of the second tube can be inserted in order to connect and couple the tubes together.

The invention can be well understood and its advantages appear better on reading the following detailed description of an embodiment given by way of non-limiting example.

DETAILED DESCRIPTION OF THE DISCLOSURE

Figure 1:
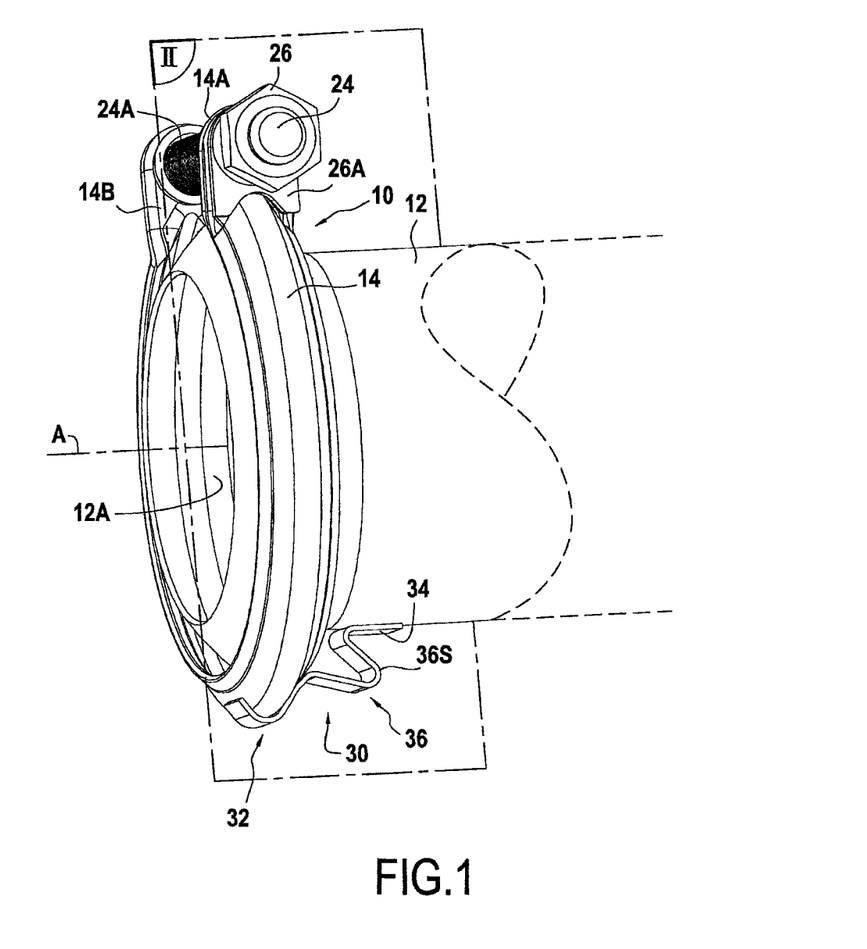
FIG. 1 is a perspective view showing the collar pre-attached at the end of the first tube, prior to tightening the collar.
Figure 2:
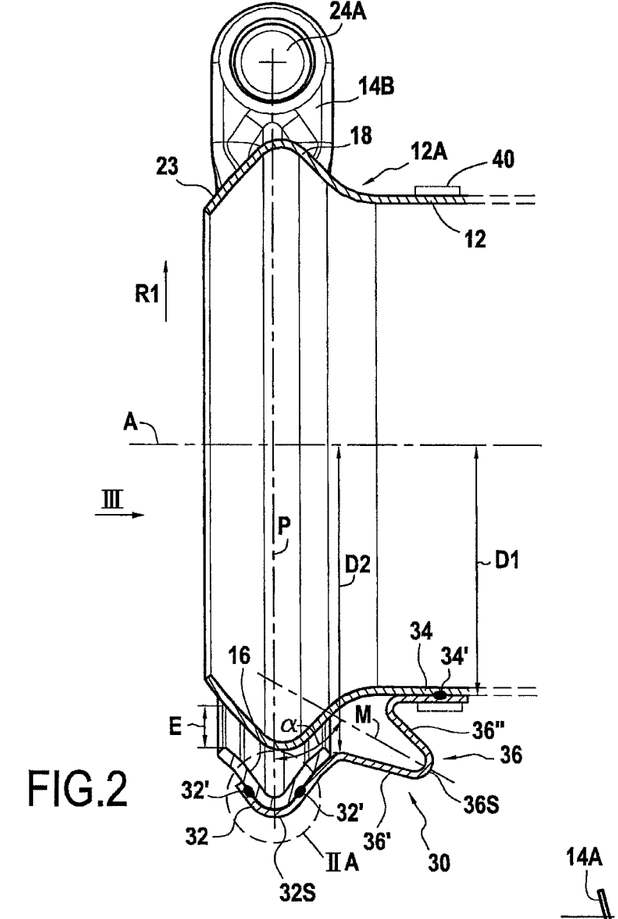
FIG. 2 is a section view on plane II of FIG. 1, this plane being defined by the axis of the tube and by a diameter of the tube passing through the retaining tab.

The description begins with FIGS. 1 and 2, which show a clamping collar 10 pre-attached at the end 12A of a first tube 12. Specifically, the collar is generally of the same type as that described by EP 1 451 498 and EP 2 598 785. Nevertheless, it should be understood that the invention is not limited to this type of collar.

Below, the term "internal" is used to designate elements that face towards the axis A of the tube 12 or that are closer to said axis relative to other elements that are said to be "external", "external" elements also being those that face away from the axis A.

Figure 5:
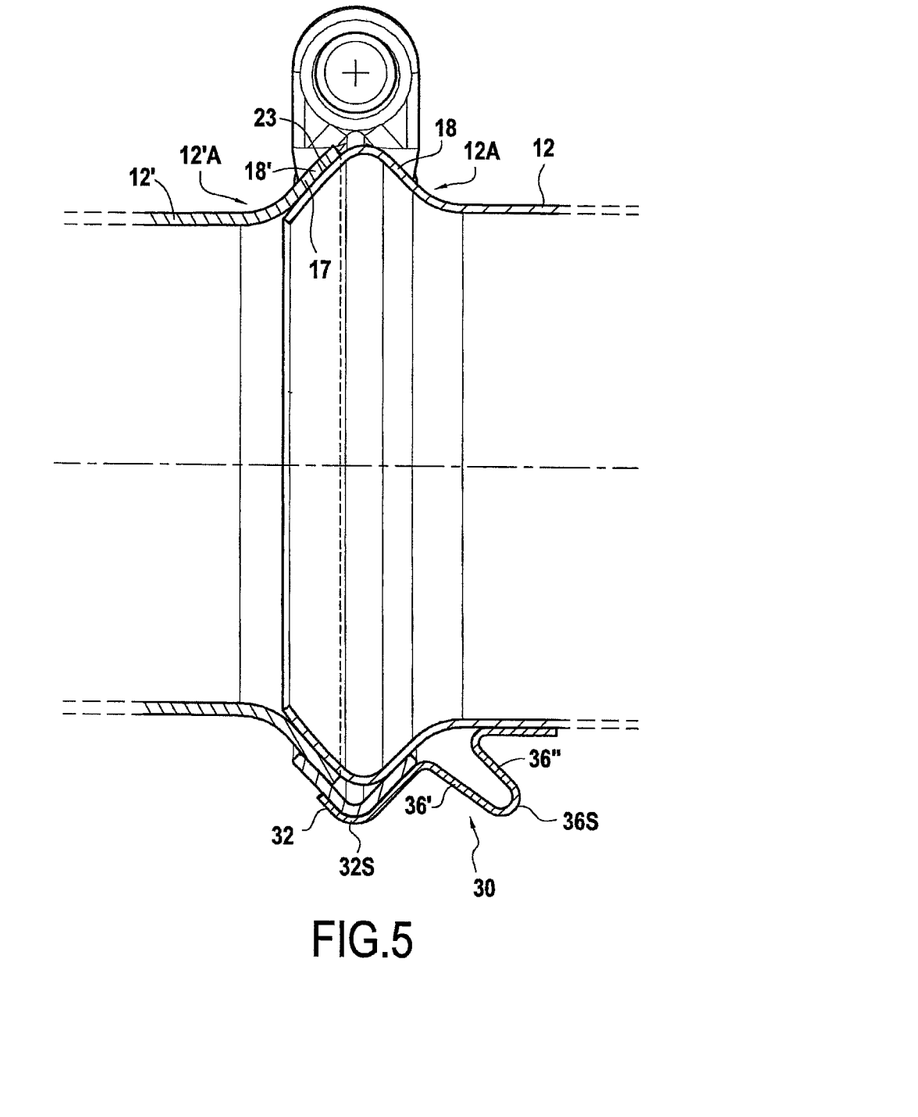
FIG. 5 is a section view on plane V of FIG. 4, this plane being analogous to the plane II of FIG. 1.

Specifically, the collar 10 comprises a band 14 having an internal periphery that defines a trough 16 into which it is possible to insert bearing surfaces, respectively a bearing surface 18 belonging to the first tube 12 and a bearing surface 18' belonging to the second tube 12' (see FIG. 5). This trough and these bearing surfaces are of shapes such that tightening the band of the collar constrains the ends of the tubes to approach each other. Thus, the band 14 presents a section that is advantageously V-shaped, while the bearing surfaces 18 and 18' are of a diameter that increases gradually going towards the free ends of tubes that are facing each other, and for example are frustoconical in shape.

The band 14 of the collar presents respective ends 14A and 14B that project substantially radially so as to form bearing tabs. These tabs are pierced so as to enable the shank 24A of a screw 24 to be passed through the tabs. The head of the screw 24 is set relative to the bearing tab 14B, while a nut 26 is held relative to the other bearing tab 14A. In the figures, the head of the screw is not visible, but it may be analogous to that shown in Documents EP 1 451 498 and EP 2 598 785. Specifically, a setting washer 26A is interposed between the bearing tab 14A and the nut 26, this washer having a notch that sets it relative to the tip of the V-shape formed by the band 14 in order to prevent it from turning relative thereto when the screw is turned.

With reference to FIG. 5, it can be seen that the end 12'A of the second tube 12' is a female end, its internal periphery being flared. In contrast, the end 12A of the first tube 12 is a male end that, beyond the bearing surface 18, presents an outer periphery 23 of diameter that decreases going towards the free end. The end portion 12A as formed in this way can thus be inserted as a substantially complementary shape inside the flare 17 formed at the end of the tube 12'. This shape, possibly associated with a washer interposed between the external periphery 23 of the free end of the first tube and the internal periphery of the flare 17 of the second tube can serve to seal the connection between the two tubes, when the clamping system is clamped. Such a washer need not be necessary, for example if a material is selected for the two tubes that allows for a small amount of deformation of the surfaces that come into contact under the effect of the clamping, thereby providing the necessary sealing, in particular when the required level of sealing is not extremely high.

The clamping collar 10 has a retaining tab 30 that, in the pre-attached state of the collar, is fastened to the first tube 12. This tab 30 presents a fastener portion 32 whereby it is fastened to the band of the collar, and an attachment portion 34 whereby it is fastened to the tube 12. Specifically, the fastener portion 32 is in the shape of a hook having its free end pointing towards the axis A. Seen in axial section, this fastener portion presents a shape that is substantially V-shaped (seen in axial section), suitable for receiving in its recess the V-shape of the band of the collar. It can also be seen that the fastener portion 32 is specifically formed at the free end of the retaining tab remote from its attachment portion 34. The tab 30 is generally oriented substantially axially going away from its fastener portion and to its attachment portion, and it extends towards the rear of the collar, i.e. in the direction along the tube 12 going away from its end 12A.

In the free state, i.e. before pre-attachment of the collar 10 on the tube 12, or in the pre-attached state, the attachment portion 34 of the retaining tab 30 extends at a distance D1 from the axis of the collar (coinciding in the figure with the axis A of the tube 12), which distance is less than or equal to the internal radius D2 of the band of the collar (which internal radius is then naturally measured while the collar is in the non-clamped state).

The fastener portion 32 of the retaining tab 30 may be fastened to the band 14 by any appropriate means. Thus, it may be welded on the band, and in FIG. 2 there can be seen two spot welds 32' situated on respective flanks of the V-shape.

Figures 2A, 3:
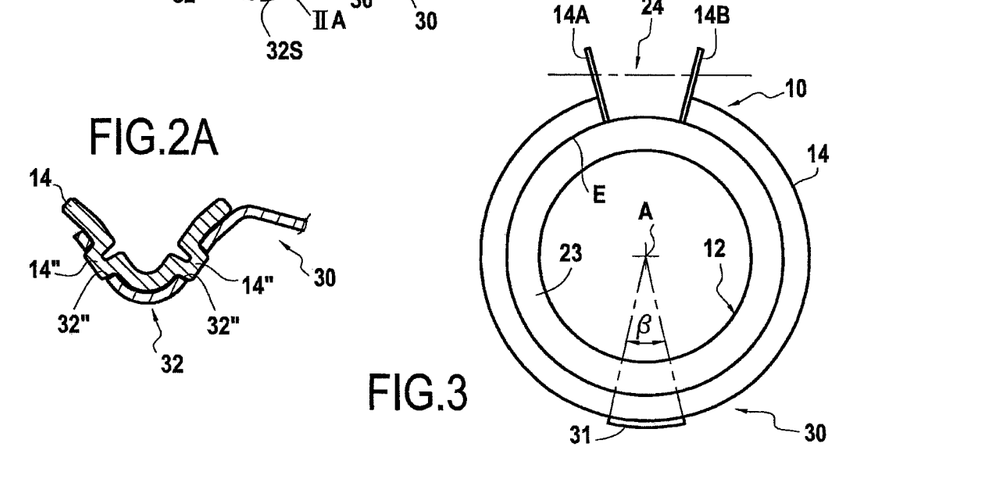
FIG. 2A shows a variant for fastening the retaining tab to the band of the collar, in zone IIA of FIG. 2.
FIG. 3 is a diagrammatic end view looking along arrow III of FIG. 2.

As shown in FIG. 2A, it is also possible to envisage some other mode of fastening such as clinching or crimping. Thus, FIG. 2A shows the fastener portion 32 of the tab 30 presenting two notches 32", respectively in each of the branches of the V-shape, with the material of the band 14 of the collar being forced into them in order to form projections 14" that penetrate into the notches.

With the above-mentioned V-shape for the section of the band 14 and for the fastener portion 32 of the retaining tab 30, it is advantageous to provide a fastener point on each branch of the V-shape.

By way of example, fastening could equally well be achieved by hooking, with the notches 32" being replaced by small hooks that penetrate into notches formed in the positions of the projections 14", or vice versa, or by clipping, e.g. by using separate staples or clips (not shown).

In general manner, numerous modes of fastening can be envisaged, the fastening between the retaining tab and the band of the collar not being subjected to high stresses, in principle.

The collar assembly, comprising the band and the retaining tab is manipulated as a unit and can be delivered in an assembled state.

The attachment portion 34 of the retaining tab enables the collar to be attached to the first tube 12 in the pre-attached situation.

Specifically, it can be seen that the attachment portion 34 is axially oriented, being situated remote from the fastener portion 32 and being fastened against the external periphery of the tube 12. In particular, the attachment portion of the retaining tab 30 may be attached to the first tube 12 by welding, having one or more spot welds 34'.

It is nevertheless possible to envisage other ways of attaching the attachment portion to the tube. For example, as shown by chain-dotted lines, the attachment portion 34 may be secured to an attachment collar 40 that is itself attached around the tube 12. In particular, it may be a collar of the type having two ends that hook each other. Thus, this collar is initially opened in order to be passed around the tube, and is then closed and clamped against the tube. By way of example, it may be a collar of the type described in European patent Document EP 0 003 192. The attachment portion 34 of the retaining tab may be fastened to this collar by any appropriate means, in particular by welding, clipping, crimping, or clinching.

When an attachment collar 40 is used, the assembly constituted by the clamping collar 10, including the retaining tab 30, and the attachment collar 40, can be delivered as a unit and pre-attached at the end of the tube 12.

The retaining tab 30 presents an undulation 36 that is situated between its attachment portion 34 and its fastener portion 32. This undulation projects radially outside of the first tube 12. It is situated on an intermediate portion of the tab 30 that forms a transition between the attachment portion 34, which is substantially situated on the diameter of the collar, and the fastener portion 32, which is substantially situated on the running diameter of the first tube. The undulation presents a ridge 36S situated on the intermediate portion, substantially halfway between the attachment and fastener portions. Seen in a radial plane, the undulation forms a portion of a loop or of a rounded V-shape. Specifically, it is convex when seen from the outside. It can also be seen that the undulation 36 is inclined relative to a radial plane P (see FIG. 2), such that going towards the ridge 36S of the undulation, also involves going away from the fastener portion 32. Specifically, the angle of inclination a in the non-clamped state of the collar is of the order of 30 degrees to 60 degrees. This angle is measured between the plane P and a midplane M of the undulation passing through its ridge 36S. The undulation extends over the entire width of the retaining tab, which width is measured perpendicularly to the plane of FIG. 2, and thus forms a wave of the retaining tab.

Figure 4:
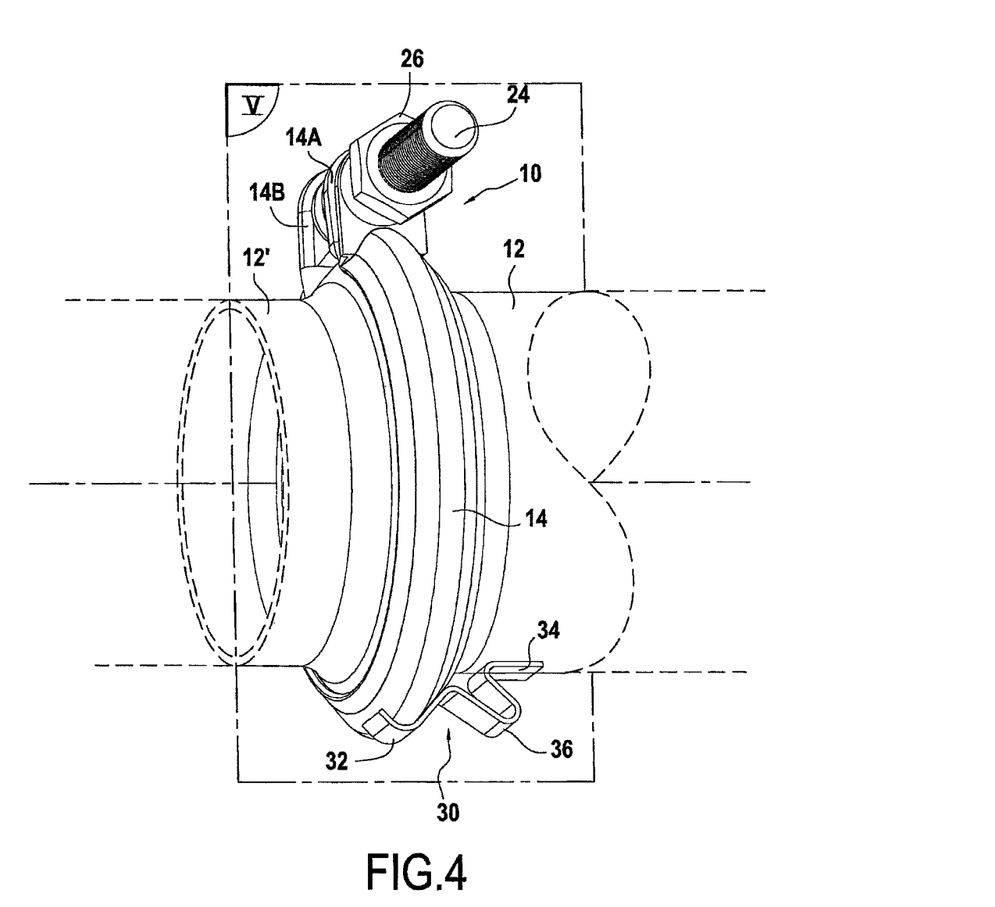
FIG. 4 is a view analogous to FIG. 1, but showing the collar tightened and the first tube coupled to a second tube.

The retaining tab is formed in a strip, in particular a strip of metal material that is folded and hardened in suitable manner. With reference in particular to FIGS. 2 and 4, it can be seen that both in the non-clamped state and in the clamped state of the collar, the undulation is generally contained within the radial extent of the clamping system, since the ridge 36S of the undulation projects little or not at all radially outwards beyond the ridge 32S of the hook formed at the fastener portion 32.

In the embodiment shown, a single retaining tab 30 suffices to retain the collar in the pre-attached state at the first end 12A of the tube 12. With reference to FIGS. 2 and 3, it can be seen that in the pre-attached state of the collar 10 at the end 12A of the tube 12, there is an annular space E formed between the external periphery of the tube 12 and the internal periphery of the band 14 of the collar. It can also be seen in FIG. 3 that in the pre-attached state the collar is substantially centered relative to the tube, the axis of the collar in this figure coinciding with the axis A of the tube.

Thus, the annular space E enables the end 12'A of the second tube 12' to be inserted under the band 14 of the collar and enables the two tubes to be coupled together (see FIGS. 4 and 5).

Thus, the retaining tab 30 is sufficiently rigid to carry the band of the collar in a cantilevered-out position and to hold it correctly positioned relative to the first tube 12. Furthermore, the retaining tab 30 can be flexed elastically, firstly to facilitate pre-attachment the collar on the first tube, should that be necessary, and secondly to enable the tab to accompany the reduction in the diameter of the collar when the collar is tightened. The undulation 36 enhances this elastic flexibility. In FIG. 2 it can be seen that the undulation is open, i.e. that its two legs 36' and 36" that extend on either side from its ridge 36S respectively to the fastener portion 32 of the retaining tab 30 and to its attachment portion 34 for attaching to the first tube are apart. In contrast, in FIG. 5, it can be seen that the two legs 36' and 36" have moved towards each other.

As mentioned above, the retaining tab may be fabricated using the same material as the band of the collar, or using a material that presents the same general mechanical properties. In particular, it may be a metal such as steel, which may be a stainless steel, depending on the application in question. For example, when the invention is applied to exhaust tubes for motor vehicles, it may be preferred to select stainless steel. In FIG. 3, it can be seen that the retaining tab covers an angular sector 13 of a few degrees, e.g. of the order of 2° to 10°. In numerous circumstances, if the collar has a diameter of the order of 60 millimeters (mm) to 100 mm (as happens for example when it is used for butt-joining two exhaust tubes for a vehicle engine), the retaining tab may have a width (measured in the conferential direction of the collar) that is of the order of 10 mm to 20 mm. The retaining tab may have thickness analogous to the thickness of the band of the collar. In particular, it may have a thickness of the order of 1 mm to 1.5 mm.

Once the collar is in the standby position, i.e. in the pre-attached situation, on the end 12A of the first tube 12, it can be handled as a unit together with the first tube. In order to assemble the first tube 12 with the second tube 12', the second tube is brought towards the end 12A of the first tube and its end 12'A is inserted into the above-mentioned annular space E, after which the collar is tightened in conventional manner. Specifically, the tightening means of the collar comprise the above-mentioned screw which, when the nut is screwed onto the threaded shank of the screw, reduces the space between the bearing tabs 14A and 14B. Naturally, other tightening means could be envisaged, and in particular hooking or pinching means.

The invention claimed is:

1. A system for connecting two tubes together end to end, the system comprising a clamping collar having a clamping band suitable for being tightened around the abutting ends of the two tubes, the collar having a retaining tab that extends outside the band and presents a fastener portion whereby said retaining tab is fastened to the band of the collar, the fastener portion extending substantially axially towards an attachment portion of said retaining tab whereby said retaining tab is suitable for being attached to the first tube outside the band, in the vicinity of the first end of the first tube, the retaining tab presenting an undulation situated between its fastener portion and its attachment portion, which undulation presents a ridge situated between the attachment portion and the fastener portion, wherein the band has a convex shape seen in an axial section and from the outside, and the fastener portion of the retaining tab presents a recess receiving said convex shape.

2. The system as claimed in claim 1, wherein the undulation projects radially.

3. The system as claimed in claim 1, wherein the undulation is inclined relative to a radial plane, such that going towards the ridge of the undulation involves going away from the fastener portion.

4. The system as claimed in claim 1, wherein the internal periphery of the collar presents a trough suitable for receiving a radial projection formed at the end of the first tube.

5. The system as claimed in claim 1, wherein the attachment portion of the retaining tab extends at a distance from the axis of the collar that is less than or equal to the internal radius of said band in the non-clamped state.

6. The system as claimed in claim 1, wherein the collar presents two ends suitable for being moved relative to each other in order to tighten the collar, and the retaining tab is substantially diametrically opposite these ends.

7. The system as claimed in claim 1, wherein the fastener portion is formed at a free end of the retaining tab remote from its attachment portion.

8. The system as claimed in claim 1, wherein the fastener portion of the retaining tab is fastened to the band of the collar by at least one of the modes of fastening comprising welding, crimping, clinching, hooking, or clipping.

9. An assembly for coupling two tubes together, the assembly comprising a system as claimed in claim 1 and a first tube having attached thereto the attachment portion of the retaining tab and suitable for being abutted with a second tube, the band of the collar extending around the end of the first tube.

10. The assembly as claimed in claim 9, wherein the attachment portion of the retaining tab is attached to the first tube by welding or brazing.

11. The assembly as claimed in claim 9, wherein, in the non-clamped state, the band of the collar is radially spaced apart from the end of the first tube.

12. The system as claimed in claim 1, wherein the ridge is situated substantially halfway between the attachment portion and the fastener portion.

13. An assembly for coupling two tubes together end to end, the assembly comprising a clamping collar having a clamping band suitable for being tightened around the abutting ends of the two tubes, the collar having a retaining tab that presents a fastener portion whereby said retaining tab is fastened to the band of the collar, the fastener portion extending substantially axially towards an attachment portion of said retaining tab, said attachment portion being attached to the first tube by an attachment collar, the retaining tab presenting an undulation situated between its fastener portion and its attachment portion, wherein the band has a convex shape seen in an axial section and from the outside, and the fastener portion of the retaining tab presents a recess receiving said convex shape.

14. A system for connecting two tubes together end to end, the system comprising a clamping collar having a clamping band suitable for being tightened around the abutting ends of the two tubes, the collar having a retaining tab that presents a fastener portion whereby said retaining tab is fastened to the band of the collar, the retaining tab extending substantially axially from its fastener portion, in a direction going away from the band, to an attachment portion of said retaining tab whereby said retaining tab is suitable for being attached to the first tube, in the vicinity of its first end, the retaining tab presenting an undulation situated between its fastener portion and its attachment portion, which undulation presents a ridge situated between the attachment portion and the fastener portion, wherein the band has a convex shape seen in an axial section and from the outside, and the fastener portion of the retaining tab presents a recess receiving said convex shape.

\* \* \* \* \*